(No Model.)
D. BOORMAN.
SHAFT COUPLING.
No. 432,364. Patented July 15, 1890.
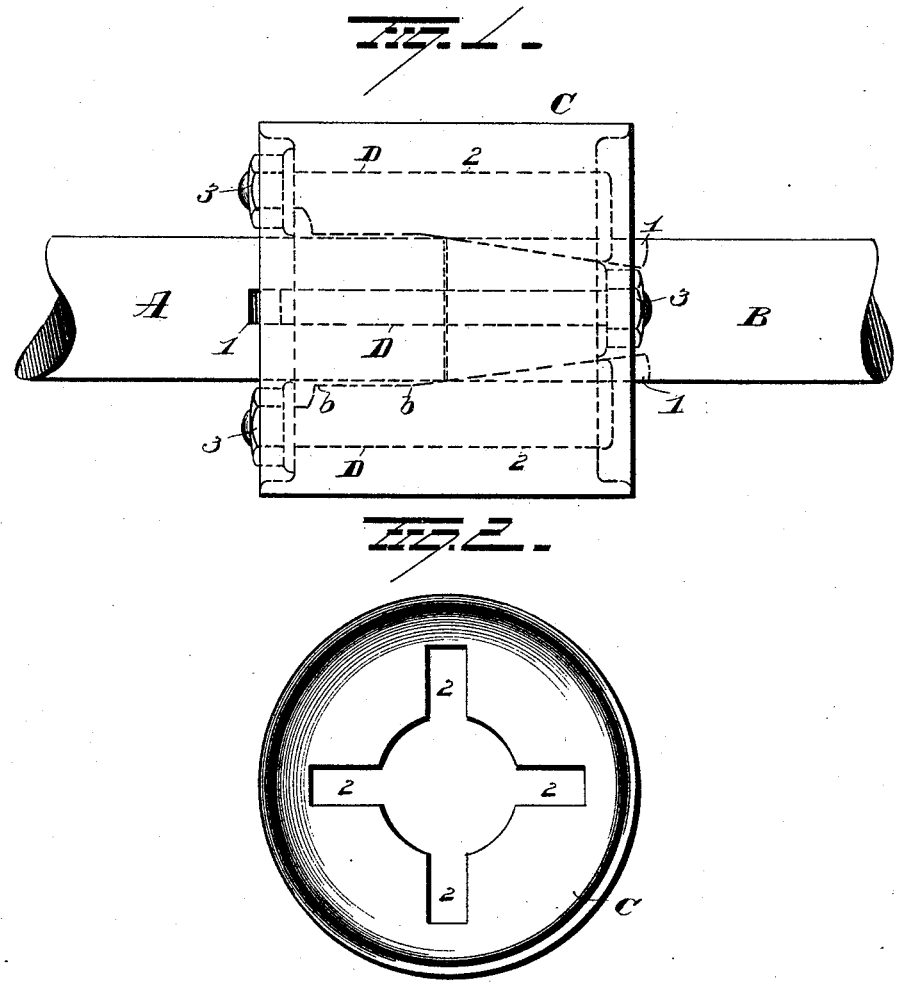
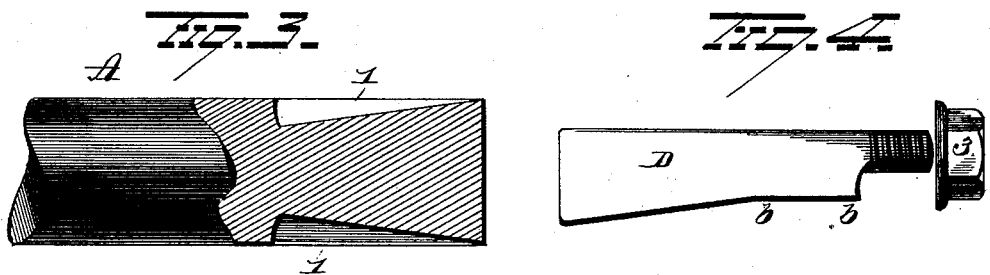
Witnesses
F. Nottingham
G. F. Downing
Inventor
David Boorman
By his Attorney
H. A. Symons

UNITED STATES PATENT OFFICE.

DAVID BOORMAN, OF ALTOONA, PENNSYLVANIA.

SHAFT-COUPLING.

SPECIFICATION forming part of Letters Patent No. 432,364, dated July 15, 1890.

Application filed April 24, 1890. Serial No. 349,298. (No model.)

*To all whom it may concern:*

Be it known that I, DAVID BOORMAN, a resident of Altoona, in the county of Blair and State of Pennsylvania, have invented certain new and useful Improvements in Shaft-Couplings; and I do hereby declare the following to be a full, clear, and exact description of the invention, such as will enable others skilled in the art to which it appertains to make and use the same.

My invention relates to an improvement in shaft-couplings, the object being to provide a simple and solid coupling which can be readily tightened, loosened, or coupled or uncoupled; and with this end in view it consists in a pair of shafts, a collar having key-seats or recesses therein and an opening through it to receive the ends of the shafts to be coupled thereto, in connection with wedge-shaped keys adapted to fit in recesses in the shaft and nuts or equivalent devices for tightening the coupling.

It further consists in certain novel features of construction and combinations of parts, as will be hereinafter described, and pointed out in the claims.

In the accompanying drawings, Figure 1 is a side elevation showing interior construction in dotted lines. Fig. 2 is an end elevation. Fig. 3 is a detached view of the end of the shaft to be coupled, and Fig. 4 is a view of one of the keys.

A and B represent a pair of shafts, the ends of which are provided with one or more—preferably two or three—key-seats 1 1. The depth of the latter increase gradually as they extend from the extreme ends inward toward the center.

C is a collar, the center of which is bored to receive the ends of the shafts. The collar is provided with key-seats 2 2, cut straight through the collar, their number being double the number of key-seats in each shaft, and when the ends of the shafts are inserted in the collar the key-seats in the two shafts are made to register with alternate key-seats in the collar, and the openings formed by such key-seats are adapted to receive suitable keys. D D represent these keys. They are a trifle longer, or, if more convenient, about the length of the collar, and their shape conforms to the openings made by the superposed key-seats, one end having an inclining edge adapted to rest upon the sloping portion of the key-seat, and the back is straight, as well as the portion b b, between the sloping portion and the small end of the key, so as to form no obstruction for the end of the shaft opposite this portion. The keys are screw-threaded on the small end, and nuts 3 3 are turned on them to draw them up tightly into the key-seats and to tighten the shaft-coupling. The ends of the collar are preferably flanged so that the ends of the keys are partially, if not wholly, concealed. When the parts are assembled, the alternate keys of course are turned in opposite directions and the nuts are screwed on tightly. When thus assembled, the shafts are held securely together and prevented from turning.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. In a shaft-coupling, the combination, with a pair of shafts having key-seats formed therein, said key-seats increasing in depth from the ends of shaft toward center, of a collar having key-seats therein, keys made to conform to the shape of the openings formed by the key-seats in the shafts and collar when registering with one another, and devices on the ends of the keys for holding them securely in place, substantially as set forth.

2. In a shaft-coupling, the combination, with a pair of shafts having key-seats therein which increase in depth from the ends toward center of shafts, of a collar having straight key-seats therein, keys formed to correspond in shape with the openings formed by the key-seats in the shaft and collar registering with one another, the ends of the keys protruding out at the ends of the collar and having threads thereon, nuts for tightening the keys, and flanges on the ends of collar, substantially as set forth.

In testimony whereof I have signed this specification in the presence of two subscribing witnesses.

DAVID BOORMAN.

Witnesses:
PETER MORGAN,
WALTER ROWLAND.